May 16, 1967  M. J. WACLAWEK  3,319,490
AUTOMATIC CHANGE SPEED TRANSMISSION
Filed Jan. 21, 1964  3 Sheets-Sheet 2
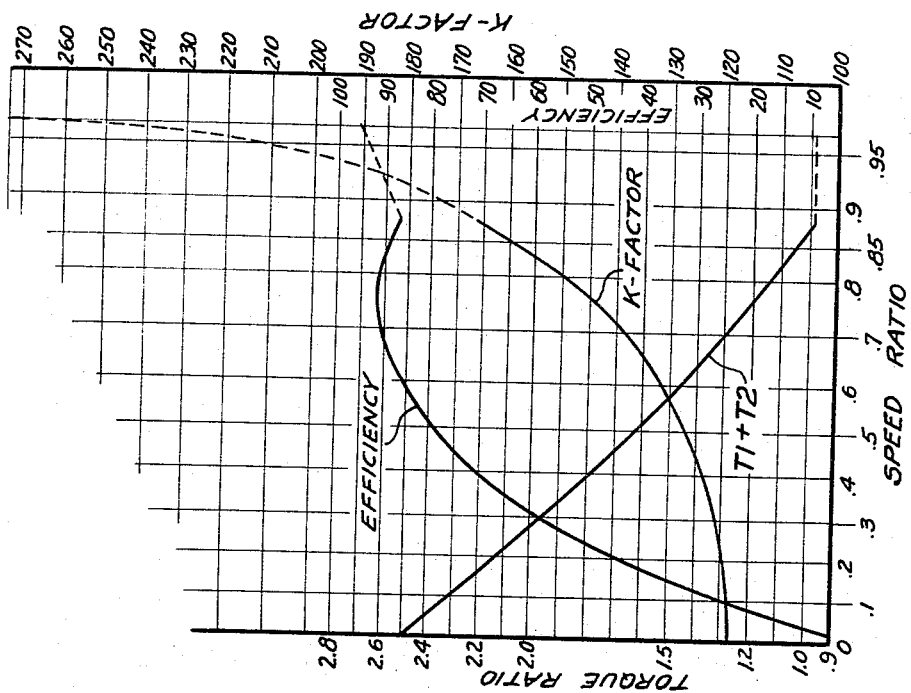
Fig. 3  4-ELEMENT TORQUE CONV. (LOW RANGE)
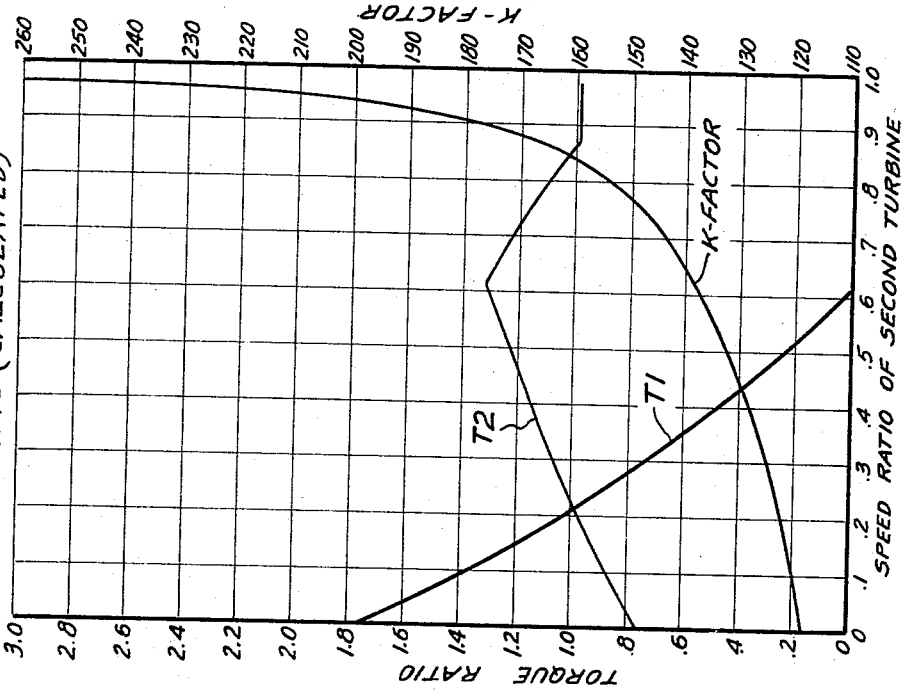
Fig. 2  4-ELEMENT TORQUE CONVERTER DRIVE RANGE (CALCULATED)
Inventor:
Miczyslaw J. Waclawek
By: Joseph W. Malleck Atty.

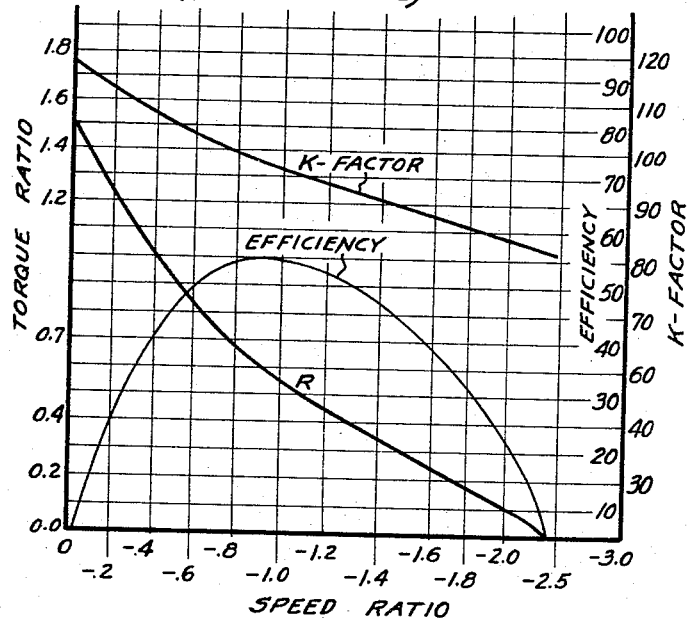

United States Patent Office 3,319,490
Patented May 16, 1967

3,319,490
AUTOMATIC CHANGE SPEED TRANSMISSION
Miczyslaw J. Waclawek, Olympia Fields, Ill., assignor to Borg-Warner Corporation, Chicago, Ill., a corporation of Illinois
Filed Jan. 21, 1964, Ser. No. 339,145
6 Claims. (Cl. 74—677)

This invention relates to transmissions, and more particularly to transmissions of the type employing a hydraulic torque converter in series with a mechanical torque multiplying means.

A primary object of this invention is to provide a variable speed transmission utilizing hydraulic and mechanical torque multiplying means in which the overall torque ratio of the transmission is increased over that now used in the art without the necessity of changing the mechanical torque multiplying means or effecting an extra automatic or manual shift of such mechanical means while retaining other equivalent operating characteristics such as good coupling efficiency.

Another object of this invention is to provide a variable speed transmission of the above type which has highly improved torque multiplying characteristics over a broader range while utilizing the characteristics of a single stage torque converter construction; more specifically it is an object to provide an improved transmission having a mechanical transmission unit connected in series with a split turbine hydraulic torque converter, the torque converter having at least two output members, both drivingly associated with one element of said mechanical transmission unit, said transmission including instrumentalities adapted to gradually change said torque converter from one phase to the other while transmitting power from both said converter output elements to said mechanical transmission unit, and instrumentalities effective to interconnect one of said converter output elements directly with the driven shaft of said transmission while retaining the power transmitting relationship of both said converter output elements with said mechanical transmission unit.

Another object is to provide a transmission of the above type which utilizes a single planetary gear unit connected in a unique manner with a split turbine (single stage) torque converter to achieve a drive range having good cupling efficiency, a reverse range, and a high torque range serving as low gear; said transmission having enhanced simplicity for economy of manufacture and durability of operation; a feature of the transmission is the ability to change from the drive range to the low range merely by releasing a clutch which is defined as a half-overlap shift in the art since it does not require the simultaneous engagement of another band brake or clutch.

Specific features pursuant to the above object is the provision of driving connection between one element of said mechanical transmission unit and both of said converter output elements (turbines) by way of a plurality of one-way friction devices, the one-way friction devices permitting each of the output elements to gradually assume a dominant power transmitting condition depending upon the speed of the converter fluid, the instrumentalities effective to interconnect one of the converter output elements with the driven shaft directly include a clutch and a one-way friction device and permit the division of driving power to take place gradually without disturbing the power transmitting relationship of the turbines with respect to the mechanical unit.

Other objects and advantages of the present invention will become apparent from the following detailed description when read in conjunction with the accompanying drawings, wherein:

FIG. 2 is a chart illustrating operational characteristics of the transmission in the drive range condition;

FIG. 3 is a chart similar to FIG. 2 illustrating the low range condition; and

FIG. 4 is another chart similar to FIG. 2 illustrating the reverse range condition.

Figure 1:
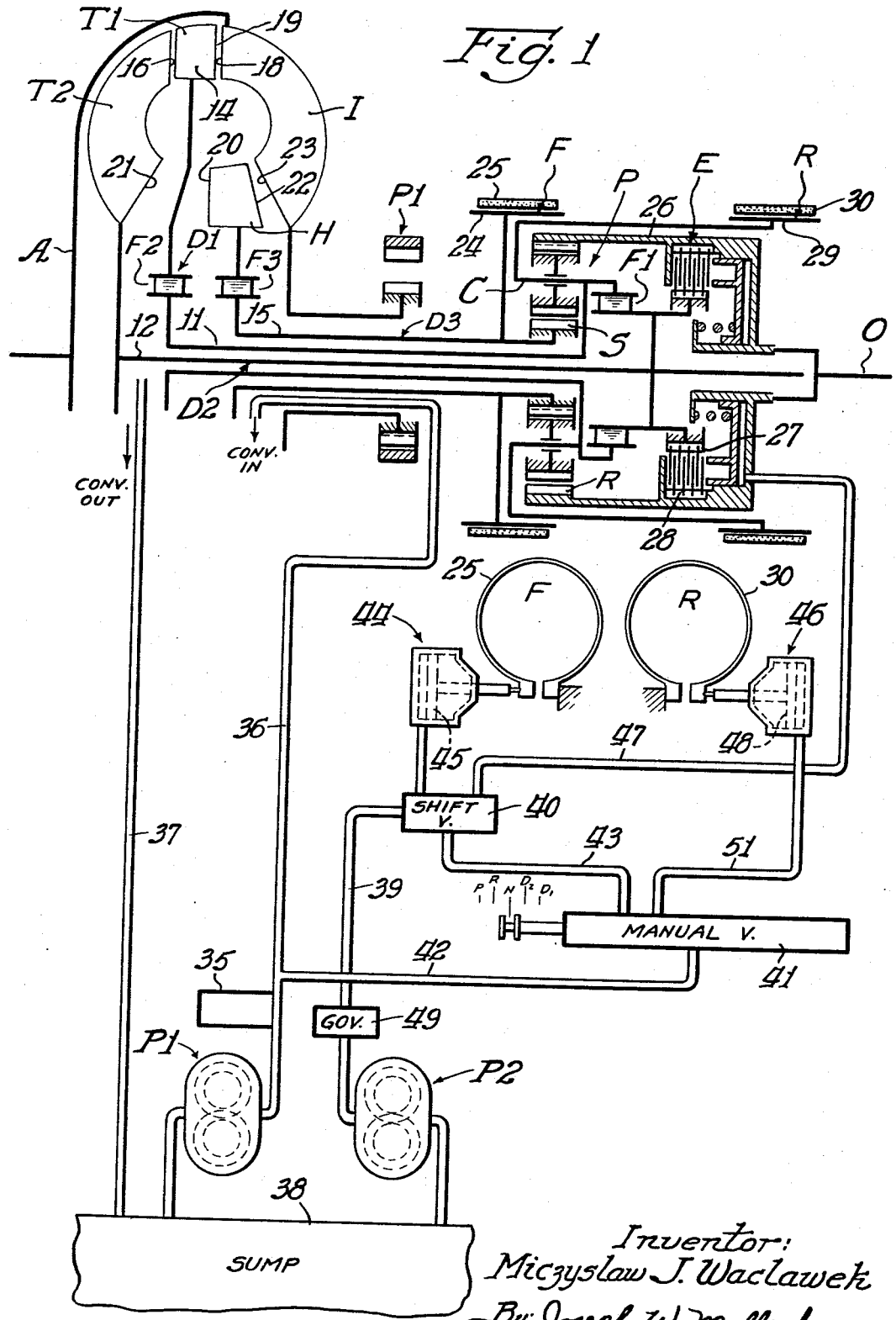
FIG. 1 is substantially a schematic illustration of a variable speed transmission embodying the principles of this invention.

Turning now to the drawings and more specifically to FIG. 1, a substantially schematic representation of the preferred embodiment of this invention is shown and comprises a rotative input means A drivingly connected with the impeller I of a split turbine (three phase) hydraulic torque converter B. The torque converter B is associated in series with a mechanical gear unit or torque multiplying means P which in turn is drivingly connected with an output means O. The torque converter B further comprises a first turbine T1 and a second turbine T2 arranged adjacent each other within the profile of the toroidal fluid path of the torque converter. A reaction element H is positioned within said fluid circuit between the turbine T2 and the impeller I.

The mechanical transmission unit or torque multiplying means P comprises a planetary gear unit including a sun gear S interengaged with a plurality of planetary gears carried on a carrier C, the planetary gears in turn are interengaged with an annular ring gear R drivingly connected with the output means O.

The association of the torque converter B with the mechanical transmission unit P is as follows: a first sleeve shaft 11 has one end drivingly connected with the planetary carrier C and an opposite end disposed centrally within the torque converter B. Turbine T2 is drivingly connected with a central shaft 12 extending through the sleeve shaft 11 and transmits rotative power to the sleeve shaft 11 in one direction by way of a one-way friction device F1 interposed between the shafts 11 and 12. The one-way friction device F1 may be of conventional types having sprags or rollers. The connection to the carrier and the one-way friction device F1 and shafts 11 and 12 constitute a power transmitting means D2 between the turbine T2 and the mechanical unit P.

Turbine T1 has a vaned portion 14 being disposed adjacent the leading edge 16 of the turbine T2. Turbine T1 is drivingly connected with the sleeve shaft 11 by way of one-way friction device F2 adapted to transmit rotative power to the sleeve shaft 11 in a direction the same as transmitted by T2 and F1; the sprags of F2 will be arranged in an opposite manner from that of the friction device F1, since they are disposed in radially opposite positions relative to the shaft 11. The connection with the carrier C, the sleeve shaft 11 and the one-way friction device F2 constitutes a power transmitting means D1 between the turbine T1 and the mechanical transmission unit P.

The impeller I is arranged in the toroidal fluid circuit so that the trailing edge 18 thereof is closely adjacent the leading edge 19 of portion 14 of the turbine T1. The stator or reactor element H is arranged in the circuit so that its leading edge 20 is adjacent the trailing edge 21 of the turbine T2 and has a trailing edge 22 adjacent the leading edge 23 of the impeller I. The stator H is drivingly connected with the sun gear S of the mechanical unit P by another sleeve shaft 15 disposed concentrically about the intermediate sleeve shaft 11; a one-way friction F3 is employed to lock up in the opposite rotative direction from that permitting drive by the one-way friction devices F1 or F2. The sleeve shaft 15 and the one-way friction device F3 with the connections to the stator and sun gears together constitute a power transmitting means D3. The power transmitting means D3 also includes a brake F which is connected with the sleeve shaft 15 and is adapted to be selectively controlled for regulating forward drive of the transmission by locking up the sleeve shaft 15 from movement in either rotative direction. The brake F comprises a brake drum 24 connected to the sleeve shaft 15 and a brake band 25 is adapted to be brought into wrapping engagement with the drum 24; the brake F may be actuated by conventional hydraulic means known in the art.

To provide for selective direct driving connection between the turbine T2 and the output means O, a hydraulically actuated clutch E is employed having a drum 26 connected with the ring gear R and also connected with the output means O; an inner drum 27 is directly connected with the central shaft 12. Each of the drums 26 and 27 carries a plurality of friction discs 28 interleaved with each other and adapted to be brought into engagement by means conventional in the art.

In order to provide for reverse drive through the transmission a reverse brake R is employed that has a brake drum 29 connected with the carrier C and has a brake band 30 adapted to be brought into rapid engagement with the drum 23 by conventional means in the art.

A suitable transmission control for the transmission (of the type known in the art) can provide two effective forward drive ranges which may be selected manually or automatically. A low drive range would be experienced when the brake F is applied and the reverse brake R and clutch E disapplied. In such condition of the transmission all the power received from the prime mover (such as an engine, not shown) would be multiplied through the torque converter and again through the mechanical transmission unit P. However, the torque converter would proceed through three stages, the first stage being experienced as the turbine T1 is the dominant torque multiplying means of the converter, the second stage in which the turbine T2 becomes a more dominant torque multiplier, and finally the coupling phase. Each of these phases is achieved gradually and without a stepped shift or change of position in the converter. There is no need for the application of a brake or clutch member to achieve the several phases. All of the effects of the first and the second phases are accomplished by the turbines, and sensitive to a change in speed of the circulating fluid, and reacting through the one-way friction devices F1 and F2.

The transmission control may comprise a source of fluid pressure from a sump 38 and developed by a forward pump P1 (shown in two locations in FIG. 1) and regulated in pressure by valve 35. Fluid pressure from pump P1 is delivered by conduit 36 to the inlet side of the torque converter B and also delivered by conduit 42 to a manual control valve 41; if valve 41 is in the D position, fluid will be admitted to a shift valve 40. Depending on pressure from governor 49 conveyed from a rear pump P2, the shift valve 40 will be urged to one of two positions to either engage the brake F solely or engage both the brake F and clutch E. To engage brake band 25, fluid is admitted by valve 40 to a servo-mechanism 44 having a piston 45; engagement of clutch E is provided by fluid admitted through valve 40 into conduit 47. However, the application or disapplication of the clutch E can be promoted manually (rather than automatically as in FIG. 1) and thus there will be two distinct drive ranges.

A reverse drive condition is provided by movement of manual valve 41 to "R" position whereby fluid is blocked from communication to the servo of brake F and is admitted by conduit 51 to servo-mechanism 46 having piston 48 engaging band 30. Brake R engagement locks the carrier C which in turn locks turbines T1 and T2 against reverse rotation by virtue of one-way devices F1 and F2. Thus, with drive from the rear wheels, stator H provides an impeller effect and drives the impeller I backwards.

Many compromises and balancing of factors must be made to achieve a good transmission for given power units and job requirements; however, the combination of minimum elements of this invention permits such design flexibility by utilizing some elements to provide more than one task. For example, in the drive range condition the clutch E and brake F are engaged. Torque from T2 will be directly transmitted to driven shaft and torque from T1 will be multiplied by the gear unit P. The change from any other transmission condition to drive range takes place without interrupting the driving association between the torque converter turbines T1 and T2 and the gear unit P. The factor to be considered in drive range is a good overall stall torque ratio which is in part due to a stall torque ratio of the torque converter which is not too high, so as not to sacrifice good coupling efficiency in higher speed ratios. For purposes of the preferred embodiment, the desired overall stall torque ratio in drive is 3.6, which comprised a stall torque ratio of 1.79 for turbine T1 and .77 for turbine T2; the gear unit had a torque multiplying ratio of 1.6. Thus, the mathematical formula for computing overall torque ratio would be:

$$R = \frac{A}{A-S}(PT1) + (PT2)$$

where
$R$ = total overall torque
$A$ = diameter of annular ring gear
$S$ = diameter of sun gear
$PT1$ = torque ratio of turbine T1
$PT2$ = torque ratio of turbine T2

$$R = 1.6 \ (1.79) + .77$$
$$R = 2.86 + .77$$
$$R = 3.63$$

As illustrated in FIG. 3 the torque delivered by turbine T1 will slowly phase out as fluid circulation increases and turbine T2 assumes a more dominant role; when coupling speed is reached the planetary gear assumes a locked condition and all elements (except stator) turn at the same speed. The torque ratios can be varied to suit conditions by varying the parameters of overall torque ratio, size of gears, and blade angles of the turbine. The choice of gear unit size is important in that it determines in part the degree to which turbine T1 will overrun T2 and the proportion of torque which will be contributed by each turbine.

The low range condition is achieved merely by releasing the clutch E and letting the one-way friction devices F1 and F2 do the rest. It is significant that the same planetary unit P is utilized again for use in the low range. Here, all torque from both turbines is multiplied by the gear unit;

$$R = \frac{A}{A-S}(PT1 + PT2)$$
$$R = 1.6 \ (1.79 + .77)$$
$$R = 1.6 \ (2.56)$$
$$R = 4.09$$

There will always be a limit to the amount of twist that can be imparted to fluid by guide vanes of a single turbine (single phase converter) because of ensuing choke or blocking of fluid. However, greater twist can be achieved with split turbines of the type disclosed herein permitting greater flexibility in the choice of the gear unit size and hydraulic stall torque ratio.

In FIG. 4 is illustrated the torque characteristics and performance data when the brake R is applied.

While I have described my invention in connection with certain specific embodiments thereof, it is to be understood that this is by way of illustration and not by way of limitation, and the scope of my invention is defined solely by the appended claims which should be construed as broadly as the prior art will permit.

I claim:
1. A variable speed transmission for transmitting power from a drive shaft to a driven shaft, comprising: a me- chanical transmission unit connected with said driven shaft; a plural phase, single stage hydraulic torque converter connected to said drive shaft and having at least two adjacent output elements drivingly associated in series with said mechanical transmission unit relative to the driven shaft and effective to impart torque in the same rotative direction; means responsive to the speed of fluid circulation in said converter adapted to gradually change said torque converter from one phase where both input and output elements turn together when said circulating fluid is below a predetermined value, to the other phase where only one said output element is transmitting power to said mechanical transmission unit, said change being independent of the connection between said unit and driven shaft; and means effective to interconnect one of said output elements with said driven shaft while retaining the power transmitting relationship of the other of said output elements with said mechanical transmission unit.

2. A transmission, as in claim 1, in which said means effective to interconnect with the driven shaft comprises a friction clutch and a one-way friction device, whereby release of the clutch permits the one-way friction device to smoothly and gradually shift from transmission of power directly to the driven shaft to a condition where power may be transmitted to the mechanical unit.

3. A variable speed transmission having drive and driven shafts, comprising: a torque converter drivingly associated with said drive shaft and having at least two turbine elements effective to provide at least a two-phase operation of said converter; mechanical torque multiplying means having an input element; power transmitting means interconnecting both said turbines with said input element and effective to gradually change from one phase where both of said turbines together drive said input element to the other phase of said converter where only one of said turbines is driving said input element; and means effective to modify said power transmitting means for permitting a direct driving connection of one of said turbine elements with said driven shaft while retaining said power transmitting relationship of the other of said turbine elements with said input element.

4. A variable sped transmission as in claim 3, in which said power transmitting means includes a one-way friction device drivingly interconnecting one of said turbine elements with said input element and another one-way friction device interconnecting the other of said turbine elements with said input element, said one-way friction devices cooperating to simultaneously transmit proportionate rotative power from each of said turbines when the speed of the circulating fluid within said torque converter is below a predetermined value and to transmit rotative power from only one of said turbines when said circulating fluid is above said predetermined speed value.

5. A variable speed transmission as in claim 4, in which said power transmitting means includes: a rotative element drivingly connected with said input element of the mechanical multiplying means; a portion of said first turbine element disposed concentrically about said transmitting element; a portion of said second turbine element disposed concentrically within said transmitting element; and one-way friction devices disposed respectively between said first and second turbine element portions and the transmitting element, said one-way friction devices being opposite in function in order to transmit rotative power from each of said turbines to said transmitting element in the same rotative direction.

6. A variable speed transmission for transmitting rotative power from a drive shaft to a driven shaft, comprising: a mechanical torque multiplying means, said mechanical means including a planetary gear unit having a sun gear, a ring gear, and a plurality of planetary gears intermeshed therewith and mounted upon a carrier, said hydraulic means comprising an impeller, a stator, and a first and second turbine interposed in a toroidal fluid path between said impeller and stator for imparting kinetic energy from said impeller to said hydraulic means with said mechanical means including an intermediate shaft and a quill shaft, interposed concentrically within said intermediate shaft, said first turbine being drivingly connected with said intermediate shaft by a first one-way friction means, said second turbine being drivingly connected with said quill shaft and having a second one-way friction device interposed therebetween effective to transmit rotative power to said intermediate shaft in the same rotative direction as that permitted by said first one-way friction means, said stator being connected to said sleeve shaft by a third one-way friction means effective to transmit power in the same rotative direction as said first one-way friction means, said sleeve shaft being drivingly connected with said sun gear, and said intermediate shaft being drivingly connected to said carrier, brake means for selectively braking said carrier, brake means for selectively braking said sleeve shaft, said ring gear being drivingly connected with said driven shaft and said transmission, and a clutch effective to be selectively engaged for coupling said quill shaft with said driven shaft, said transmission being particularly characterized in that, when said second brake is applied with disapplication of said clutch, said turbines each are effective to transmit rotative power simultaneously to the planetary gears of said mechanical means when the circulating fluid within said hydraulic means is below a predetermined value and only one of said turbines is effective to transmit rotative power when the circulating fluid is above said predetermined value, and, when said clutch is engaged, part of said rotative power of said second turbine is directly transmitted to said driven shaft while still retaining said driving relationship of said first turbine with said planetary gears of said mechanical means.

References Cited by the Examiner

UNITED STATES PATENTS

| 2,766,641 | 9/1956 | Kelley | 74—677 |
| 2,940,336 | 6/1960 | Simpson et al. | 74—677 |
| 2,944,441 | 7/1960 | Russell | 74—677 |
| 2,959,984 | 11/1960 | Wickman | 74—688 |
| 3,008,349 | 11/1961 | Winchell et al. | 74—677 X |
| 3,083,589 | 4/1963 | Knowles et al. | 74—677 |
| 3,120,763 | 2/1964 | Shuster | 74—677 X |
| 3,216,280 | 11/1965 | Astberg | 74—677 |

DAVID J. WILLIAMOWSKY, *Primary Examiner.*

J. R. BENEFIEL, *Assistant Examiner.*